(12) United States Patent
Sak et al.

(10) Patent No.: US 10,923,112 B2
(45) Date of Patent: *Feb. 16, 2021

(54) GENERATING REPRESENTATIONS OF ACOUSTIC SEQUENCES

(71) Applicant: Google LLC, Mountain View, CA (US)

(72) Inventors: Hasim Sak, New York, NY (US); Andrew W. Senior, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,799

(22) Filed: Dec. 5, 2019

(65) Prior Publication Data

US 2020/0118552 A1    Apr. 16, 2020

Related U.S. Application Data

(63) Continuation of application No. 16/179,801, filed on Nov. 2, 2018, now Pat. No. 10,535,338, which is a continuation of application No. 15/664,153, filed on Jul. 31, 2017, now Pat. No. 10,134,393, which is a continuation of application No. 14/559,113, filed on Dec. 3, 2014, now Pat. No. 9,721,562.

(60) Provisional application No. 61/917,089, filed on Dec. 17, 2013.

(51) Int. Cl.
| | |
|---|---|
| *G10L 15/00* | (2013.01) |
| *G10L 15/16* | (2006.01) |
| *G10L 15/02* | (2006.01) |
| *G10L 15/14* | (2006.01) |

(52) U.S. Cl.
CPC .............. *G10L 15/16* (2013.01); *G10L 15/02* (2013.01); *G10L 15/142* (2013.01); *G10L 2015/025* (2013.01)

(58) Field of Classification Search
None
See application file for complete search history.

(56) References Cited

U.S. PATENT DOCUMENTS

| 9,240,184 B1 | 1/2016 | Lin et al. |
| 9,311,915 B2 | 4/2016 | Weinstein et al. |
| 9,412,361 B1 | 8/2016 | Geramifard et al. |

(Continued)

*Primary Examiner* — Satwant K Singh
(74) *Attorney, Agent, or Firm* — Honigman LLP; Brett A. Krueger; Grant Griffith

(57) ABSTRACT

Methods, systems, and apparatus, including computer programs encoded on computer storage media, for generating representation of acoustic sequences. One of the methods includes: receiving an acoustic sequence, the acoustic sequence comprising a respective acoustic feature representation at each of a plurality of time steps; processing the acoustic feature representation at an initial time step using an acoustic modeling neural network; for each subsequent time step of the plurality of time steps: receiving an output generated by the acoustic modeling neural network for a preceding time step, generating a modified input from the output generated by the acoustic modeling neural network for the preceding time step and the acoustic representation for the time step, and processing the modified input using the acoustic modeling neural network to generate an output for the time step; and generating a phoneme representation for the utterance from the outputs for each of the time steps.

20 Claims, 4 Drawing Sheets

(56) References Cited

U.S. PATENT DOCUMENTS

| | | | |
|---|---|---|---|
| 9,437,186 B1 | 9/2016 | Liu et al. | |
| 9,620,108 B2* | 4/2017 | Sak et al. | |
| 9,697,826 B2* | 7/2017 | Sainath | H04R 3/005 |
| 9,721,562 B2* | 8/2017 | Sak | G10L 15/16 |
| 9,818,409 B2* | 11/2017 | Senior | G10L 15/02 |
| 9,886,949 B2* | 2/2018 | Li | G10L 15/20 |
| 9,984,683 B2* | 5/2018 | Li | G06N 3/0454 |
| 10,134,393 B2* | 11/2018 | Sak | G10L 15/02 |
| 10,176,819 B2* | 1/2019 | Sun | G10L 21/007 |
| 10,224,058 B2* | 3/2019 | Variani | G10L 21/028 |
| 10,515,626 B2* | 12/2019 | Li | G10L 15/16 |
| 10,535,338 B2* | 1/2020 | Sak | G10L 15/02 |
| 2015/0039301 A1 | 2/2015 | Senior et al. | |
| 2016/0035344 A1 | 2/2016 | Gonzalez-Dominguez et al. | |
| 2019/0259409 A1* | 8/2019 | Variani | G10L 15/20 |
| 2020/0118553 A1* | 4/2020 | Li | G10L 15/20 |
| 2020/0193977 A1* | 6/2020 | Ramabhadran | G10L 15/22 |

\* cited by examiner

GENERATING REPRESENTATIONS OF ACOUSTIC SEQUENCES

CROSS-REFERENCE TO RELATED APPLICATIONS

This application is a continuation of, and claims priority under 35 U.S.C. § 120 from, U.S. patent application Ser. No. 16/179,801, filed on Nov. 2, 2018, which is a continuation of U.S. patent application Ser. No. 15/664,153, filed on Jul. 31, 2017, which is a continuation of U.S. patent application Ser. No. 14/559,113, filed on Dec. 3, 2014, which claims priority under 35 U.S.C. § 119(e) to U.S. Provisional Application No. 61/917,089, filed on Dec. 17, 2013. The disclosures of the prior applications are considered part of the disclosure of this application and are hereby incorporated by reference in their entireties.

BACKGROUND

This specification relates to generating phoneme representations of acoustic sequences.

Acoustic modeling systems receive an acoustic sequence and generate a phoneme representation of the acoustic sequence. The acoustic sequence for a given utterance includes, for each of a set of time steps, an acoustic feature representation that characterizes the utterance at the corresponding time step. The phoneme representation is a sequence of phonemes or phoneme subdivisions that the acoustic modeling system has classified as representing the received acoustic sequence. An acoustic modeling system can be used in, for example, a speech recognition system, e.g., in conjunction with a pronunciation modeling system and a language modeling system.

SUMMARY

In general, one innovative aspect of the subject matter described in this specification can be embodied in methods that include the actions of receiving an acoustic sequence, the acoustic sequence representing an utterance, and the acoustic sequence comprising a respective acoustic feature representation at each of a plurality of time steps; processing the acoustic feature representation at an initial time step using an acoustic modeling neural network to generate an output for the initial time step; for each subsequent time step of the plurality of time steps: receiving the acoustic representation for the time step, receiving an output generated by the acoustic modeling neural network for a preceding time step, generating a modified input from the output generated by the acoustic modeling neural network for the preceding time step and the acoustic representation for the time step, and processing the modified input using the acoustic modeling neural network to generate an output for the time step; and generating a phoneme representation for the utterance from the outputs for each of the time steps.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The acoustic modeling neural network can be a feed-forward neural network. The acoustic modeling neural network can be a recurrent neural network. The acoustic modeling neural network can be a long short-term memory (LSTM) neural network. The output generated by the acoustic modeling neural network for each time step can be a set of scores for a set of phonemes or phoneme subdivisions, wherein the score for each phoneme or phoneme subdivision represents a likelihood that the phoneme or phoneme subdivision is a representation of the utterance at the time step. Generating the modified input can include appending the set of scores for the preceding time step to the acoustic feature representation for the time step. Generating the modified input can include appending data identifying a highest-scoring phoneme or phoneme subdivision according to the set of scores for the preceding time step to the acoustic feature representation for the time step. The set of scores can define a probability distribution over a set of Hidden Markov Model (HMM) states.

Particular embodiments of the subject matter described in this specification can be implemented so as to realize one or more of the following advantages. By combining the output from the preceding time step with the input for the current time step to generate a modified input for use by an acoustic modeling neural network in generating the output for the current time step, an acoustic modeling system can more accurately predict the phoneme representation for an input sequence. That is, because the acoustic modeling neural network is explicitly provided with the preceding output as part of the input for the current time step, the prediction made by the acoustic modeling neural network for the current time step can be more accurate.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
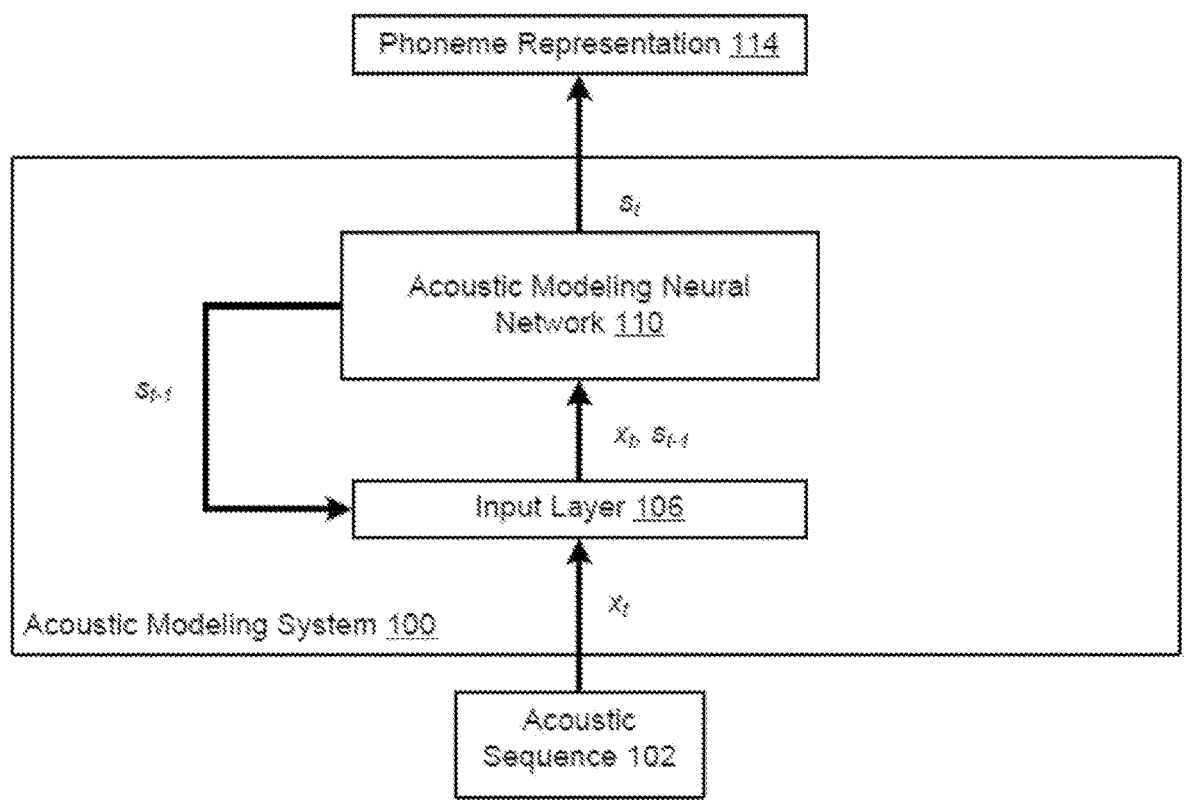
FIG. 1 shows an example acoustic modeling system.

FIG. 1 shows an example acoustic modeling system 100. The acoustic modeling system 100 is an example of a system implemented as computer programs on one or more computers in one or more locations, in which the systems, components, and techniques described below can be implemented.

The acoustic modeling system 100 receives acoustic sequences and generates phoneme representations of the received acoustic sequences. For example, the acoustic modeling system 100 can receive an acoustic sequence 102 and generate a phoneme representation 114 for the acoustic sequence 102.

The acoustic sequence 102 is a sequence that includes a respective acoustic feature representation, e.g., an acoustic feature vector, for each of a set of time steps. Each acoustic feature representation characterizes an utterance at the corresponding time step. The phoneme representation 114 for the acoustic sequence 102 includes a respective set of scores for each of the time steps. The set of scores for a given time step includes a respective score for each of a set of phonemes or a set of phoneme subdivisions. The score for a given phoneme or phoneme subdivision at a given time step represents a likelihood that the phoneme or phoneme subdivision is a representation of the utterance at the time step. For example, the set of scores may be probabilities that define a probability distribution over a set of Hidden Markov Model (HMM) states.

The acoustic modeling system 100 includes an input layer 106 and an acoustic modeling neural network 110. The acoustic modeling neural network 110 is a neural network that has been configured, e.g., through training, to receive an input from the input layer 106 and generate an output from the received input. In particular, the acoustic modeling neural network 110 receives an input for a given time step in an acoustic sequence from the input layer 106 and processes the input to generate a set of scores in accordance with current values of the parameters of the acoustic modeling neural network. As described above, the set of scores includes a score for each of a set of phonemes or a set of phoneme subdivisions, with the score for a given phoneme or phoneme subdivision representing a likelihood that the phoneme or phoneme subdivision represents the utterance at the time step.

The acoustic modeling neural network 110 can be a feed-forward neural network, e.g., a deep neural network that includes one or more layers of non-linear operations. An example deep neural network that can be used for generating phoneme representations from received inputs is described in more detail in *Deep Neural Networks for Acoustic Modeling in Speech Recognition*, G Hinton, L. Deng, D. Yu, G Dahl, A. Mohamed, N. Jaitly, A. Senior, V. Vanhoucke, P. Nguyen, T. Sainath, and B. Kingsbury, IEEE Signal Processing Magazine, November 2012, page 82.

Alternatively, the acoustic modeling neural network 110 can be a recurrent neural network, e.g., a Long Short-Term Memory (LSTM) neural network. An LSTM neural network is a neural network that has one or more LSTM memory blocks. An example LSTM neural network that can be used to generate phoneme representations from received inputs is described in more detail in *Long Short-Term Memory Based Recurrent Neural Network Architectures for Large Vocabulary Speech Recognition*, H. Sak, A. Senior, F. Beaufays, available at http://arxiv.org/pdf/1402.1128.

The input layer 106 receives acoustic feature representations at each time step of an input acoustic sequence and, at each time step, generates an input to be provided to the acoustic modeling neural network 110 for processing. In particular, for each time step t in the acoustic sequence subsequent to the initial time step in the sequence, the input layer 106 receives the feature representation $x_t$ at the time step and the output $s_{t-1}$ generated by the acoustic modeling neural network 110 for the preceding time step in the acoustic sequence. The input layer 106 generates a modified input $x_t$, $s_{t-1}$ for the current time step from the feature representation $x_t$ and the preceding output $s_{t-1}$. Generating a modified input is described in more detail below with reference to FIG. 3. The input layer 106 then provides the modified input $x_t$, $s_{t-1}$ to the acoustic modeling neural network 110 for use in generating the output for the time step t.

Once the acoustic modeling neural network 110 has generated an output for each time step in the acoustic sequence, the acoustic modeling system 100 generates the phoneme representation for the acoustic sequence from the generated outputs. In some implementations, the phoneme representation includes the set of scores for each time step. In some other implementations, the system selects the phoneme or phoneme subdivisions having the highest score at each time step and a sequence of the selected phonemes or phoneme subdivisions as the phoneme representation for the acoustic sequence.

Figure 2:
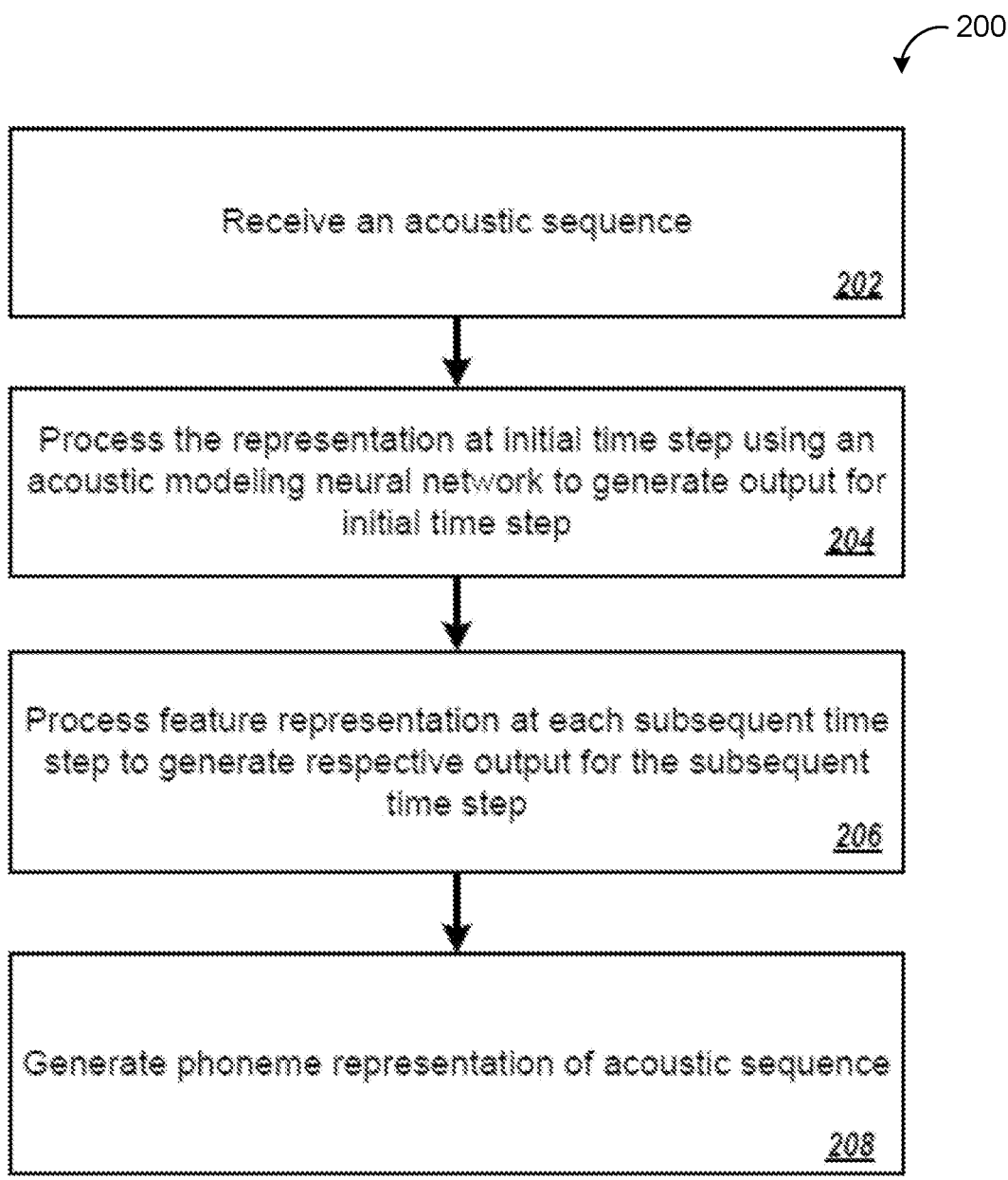
FIG. 2 is a flow diagram of an example process for generating a phoneme representation of an acoustic sequence.

FIG. 2 is a flow diagram of an example process 200 for generating a phoneme representation of an acoustic sequence. For convenience, the process 200 will be described as being performed by a system of one or more computers located in one or more locations. For example, an acoustic modeling system, e.g., the acoustic modeling system 100 of FIG. 1, appropriately programmed, can perform the process 200.

The system receives an acoustic sequence representing an utterance (step 202). The acoustic sequence includes a respective acoustic feature representation of the utterance at each of a set of time steps.

The system processes the acoustic feature representation at an initial time step using an acoustic modeling neural network, e.g., the acoustic modeling neural network 110 of FIG. 1, to generate an output for the initial time step (step 204). In some implementations, the acoustic feature representation at the initial time step is a pre-determined input that signifies that inputs that represent the utterance will follow, e.g., a vector of pre-determined values, e.g., a vector of zeroes.

The system processes the acoustic feature representation at each subsequent time step using the acoustic modeling neural network to generate a respective output for each of the time steps (step 206). Generally, for each subsequent time step, the system provides as input to the acoustic modeling neural network a modified input generated from the acoustic feature representation for the time step and the output generated by the acoustic modeling neural network for the preceding time step. Processing the acoustic feature representations at subsequent time steps is described below with reference to FIG. 3.

The system generates a phoneme representation of the acoustic sequence using the outputs generated by the acoustic modeling neural network for each time step (step 208). In some implementations, the phoneme representation includes the set of scores for each time step. In some other implementations, the system selects the phoneme or phoneme subdivision having the highest score at each time step and generates a sequence of the selected phonemes or phoneme subdivisions as the phoneme representation for the acoustic sequence.

Figure 3:
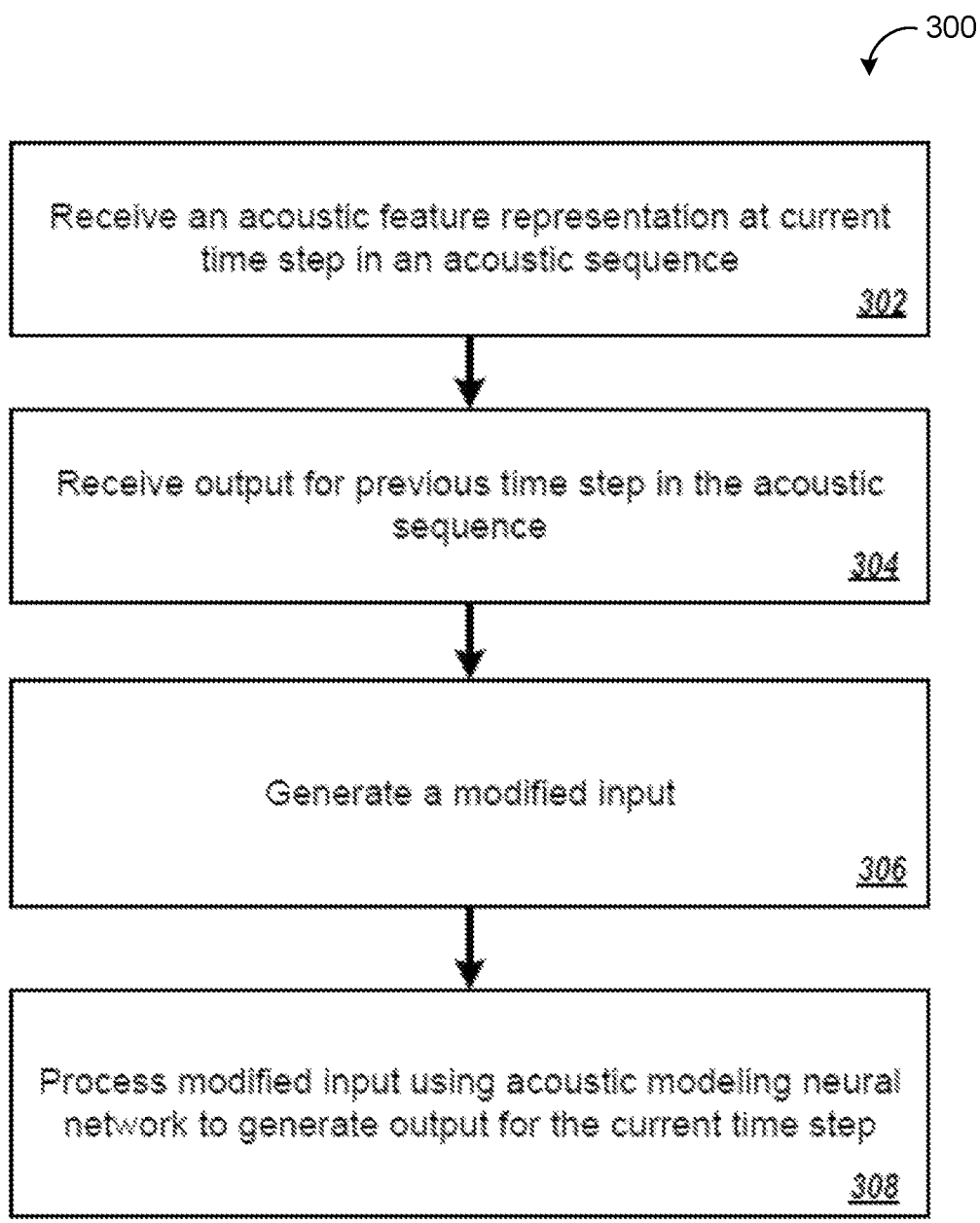
FIG. 3 is a flow diagram of an example process for processing an acoustic feature representation.

FIG. 3 is a flow diagram of an example process 300 for processing an acoustic feature representation. For convenience, the process 300 will be described as being performed by a system of one or more computers located in one or more locations. For example, an acoustic modeling system, e.g., the acoustic modeling system 100 of FIG. 1, appropriately programmed, can perform the process 300.

The system receives an acoustic feature representation at a current time step in an acoustic sequence (step 302).

The system receives an output generated by an acoustic modeling neural network for a preceding time step in the acoustic sequence (step 304). The output for the preceding time step is a set of scores, with each score corresponding to a respective phoneme or phoneme subdivision.

The system generates a modified input from the acoustic feature representation and the output for the preceding time step (step 306). In some implementations, the system generates the modified input by appending the set of scores to the acoustic feature representation. For example, if the acoustic feature representation is a vector of features, the system can generate a modified vector by appending a vector of scores to the tail of the vector of features. In some implementations, the system generates the modified input by appending data identifying one or more highest-scoring phonemes or phoneme subdivisions. For example, the system can append to the feature representation a vector that identifies the highest-scoring phonemes or phoneme subdivisions, e.g., a score vector that has a zero at each position other than positions corresponding to a threshold number of highest-scoring phonemes or phoneme subdivisions. The value of the vector at those positions can be a pre-determined value, e.g., one, or can be the score assigned to the corresponding phoneme or phoneme subdivision.

The system processes the modified input using the acoustic modeling neural network to generate an output for the current time step (step 308). That is, the acoustic modeling neural network processes the modified input and generates the set of scores for the current time step in accordance with current values of the parameters of the acoustic modeling neural network.

After trained values of the parameters of the acoustic modeling neural network have been determined, the processes 200 and 300 can be performed for an acoustic sequence for which the desired phoneme representation is not known, e.g., to generate a predicted phoneme representation for the acoustic sequence. The processes 200 and 300 can also be performed for each time step of a training sequence, i.e., an acoustic sequence for which the desired phoneme representation is already known, as part of a training process to determine the trained values of the parameters of the acoustic modeling neural network. The training process can be a conventional training process that is appropriate for training the acoustic modeling neural network. For example, if the acoustic modeling neural network is an LSTM neural network or other kind of recurrent neural network, the training process may be a backpropagation through time training process.

Figure 4:
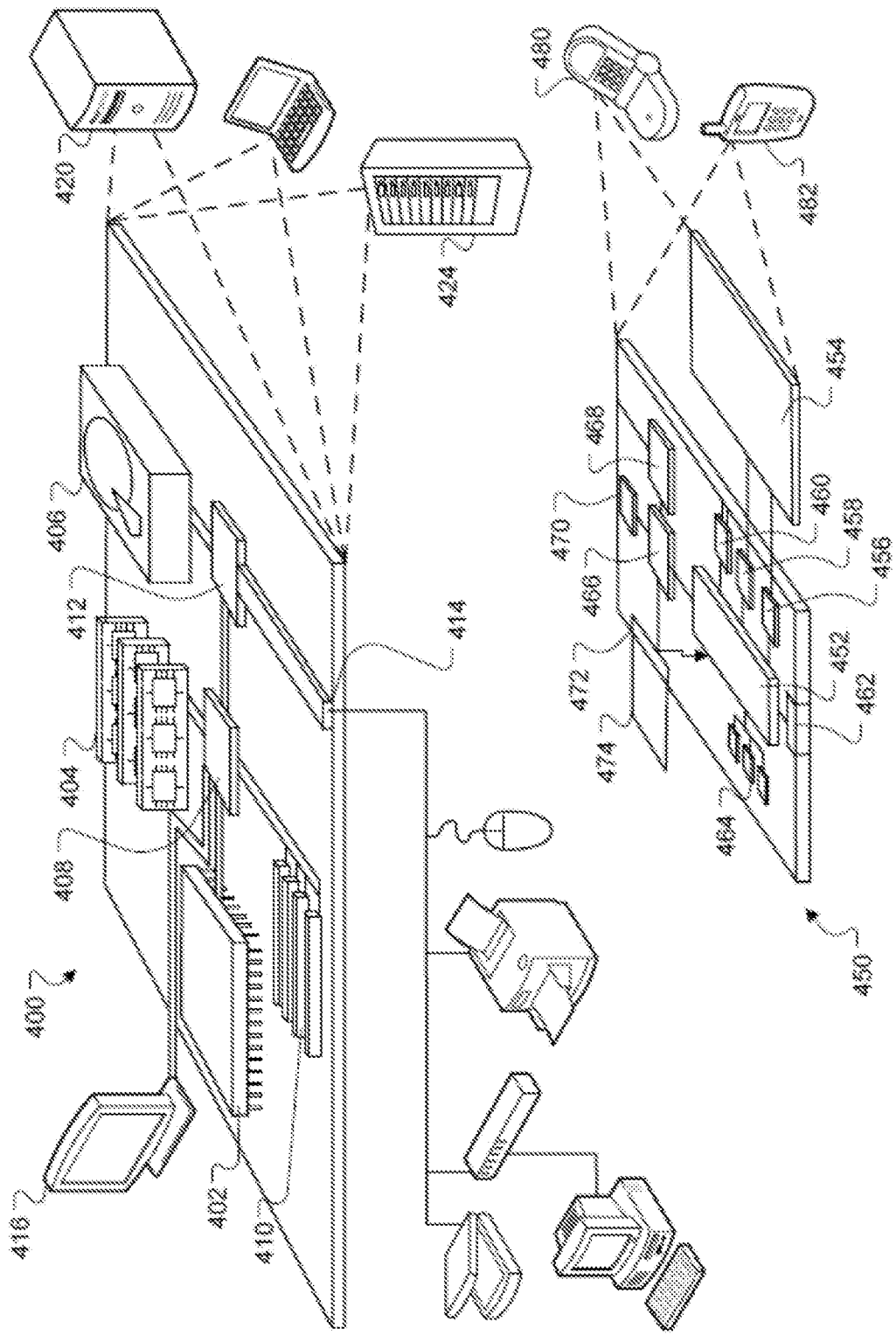
FIG. 4 is diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit), or a GPGPU (General purpose graphics processing unit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training an acoustic modeling long short-term memory (LSTM) neural network, the method comprising:
    obtaining, at an automated speech recognition (ASR) system, a training acoustic sequence comprising a respective training acoustic feature representation at each time step in a time step sequence;
    for each time step in the time step sequence:
        receiving, by the ASR system, as a corresponding input to the acoustic modeling LSTM neural network, the respective training acoustic feature representation at the time step;
        generating, by the ASR system, as a corresponding output from the acoustic modeling LSTM neural network, a corresponding probability distribution over possible phoneme subdivisions for the time step by processing the corresponding input; and
        selecting, by the ASR system, from the corresponding probability distribution over possible phoneme subdivisions for the time step, the phoneme subdivision associated with a highest probability; and
    executing, by the ASR system, a backpropagation through time training process to determine trained values of parameters of the acoustic modeling LSTM neural network using phoneme subdivisions selected for each time step of the time step sequence.

2. The method of claim 1, wherein executing the backpropagation through time training process comprises:
    generating a sequence of the selected phoneme subdivisions; and
    training the values of parameters of the acoustic modeling LSTM neural network using the sequence of the selected phoneme subdivisions.

3. The method of claim 1, wherein the training acoustic sequence is associated with a known phoneme subdivision representation.

4. The method of claim 3, wherein the known phoneme subdivision representation comprises a respective known phoneme subdivision at each time step in the time step sequence.

5. The method of claim 1, wherein the acoustic modeling LSTM neural network comprises one or more LSTM memory blocks.

6. The method of claim 1, wherein the corresponding probability distribution over possible phoneme subdivisions generated for each time step in the time step sequence represents a likelihood that each possible phoneme subdivision is a representation of the respective training acoustic feature representation at the time step.

7. The method of claim 1, further comprising, for an initial time step in the time step sequence, generating, by the ASR system, a corresponding output by processing a predetermined input using the acoustic modeling LSTM neural network.

8. The method of claim 7, wherein the predetermined input comprises a vector of predetermined values.

9. The method of claim 7, wherein the predetermined input comprises a vector of zeroes.

10. The method of claim 1, wherein the respective training acoustic feature representation at each time step in the time step sequence comprises a respective training acoustic feature vector.

11. An automated speech recognition (ASR) system comprising:
    data processing hardware; and
    memory hardware in communication with the data processing hardware and storing instructions that when executed by the data processing hardware cause the data processing hardware to perform operations comprising:
        obtaining a training acoustic sequence comprising a respective training acoustic feature representation at each time step in a time step sequence;
        for each time step in the time step sequence:
            receiving, as a corresponding input to the acoustic modeling LSTM neural network, the respective training acoustic feature representation at the time step;
            generating, as a corresponding output from the acoustic modeling LSTM neural network, a corresponding probability distribution over possible phoneme subdivisions for the time step by processing the corresponding input; and
            selecting, from the corresponding probability distribution over possible phoneme subdivisions for the time step, the phoneme subdivision associated with a highest probability; and
        executing a backpropagation through time training process to determine trained values of parameters of the acoustic modeling LSTM neural network using phoneme subdivisions selected for each time step of the time step sequence.

12. The system of claim 11, wherein executing the backpropagation through time training process comprises:
    generating a sequence of the selected phoneme subdivisions; and
    training the values of parameters of the acoustic modeling LSTM neural network using the sequence of the selected phoneme subdivisions.

13. The system of claim 11, wherein the training acoustic sequence is associated with a known phoneme subdivision representation.

14. The system of claim 13, wherein the known phoneme subdivision representation comprises a respective known phoneme subdivision at each time step in the time step sequence.

15. The system of claim 11, wherein the acoustic modeling LSTM neural network comprises one or more LSTM memory blocks.

16. The system of claim 11, wherein the corresponding probability distribution over possible phoneme subdivisions generated for each time step in the time step sequence represents a likelihood that each possible phoneme subdivision is a representation of the respective training acoustic feature representation at the time step.

17. The system of claim 11, wherein the operations further comprise, for an initial time step in the time step sequence, generating a corresponding output by processing a predetermined input using the acoustic modeling LSTM neural network.

18. The system of claim 17, wherein the predetermined input comprises a vector of predetermined values.

19. The system of claim 17, wherein the predetermined input comprises a vector of zeroes.

20. The system of claim 11, wherein the respective training acoustic feature representation at each time step in the time step sequence comprises a respective training acoustic feature vector.

\* \* \* \* \*